United States Patent Office 3,334,091
Patented Aug. 1, 1967

3,334,091

SEDATIVES

William J. Houlihan, Mountain Lakes, N.J., assignor to Sandoz Inc., Hanover, N.J.

No Drawing. Filed Mar. 25, 1965, Ser. No. 442,775
6 Claims. (Cl. 260—243)

ABSTRACT OF THE DISCLOSURE

The compounds of the subject invention are heterocyclic compounds having CNS activity. Said compounds are useful as sedatives and are structurally characterized by two rings (each having from 5 to 7 members) having a nitrogen and a carbon atom in common, having a sulfur atom ortho to the carbon atom, having a further substituent bound to said carbon atom, having no further hetero ring members and having a keto group ortho to the nitrogen atom in the ring having only one hetero ring member.

The instant invention is directed to three distinct genera of the following formulae:

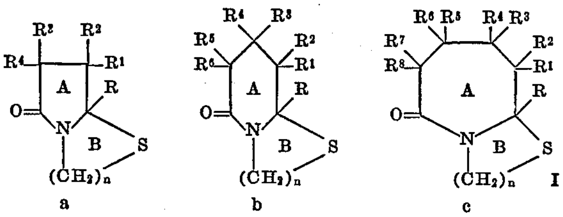

a b c I

Each genus has three subgenera dependent upon the value of *n*:

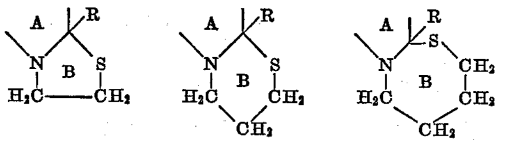

1 2 3 II

The following definitions are employed throughout the text:

R is either aryl, e.g. phenyl; ar(lower)alkyl, e.g. benzyl and phenethyl; or cycloalkyl having from 5 to 7 carbon atoms, e.g. cyclopentyl, cyclohexyl and cycloheptyl;

aryl and the ar- of ar(lower)alkyl are of the formula

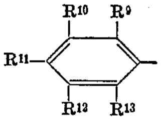

III each of $R^1$, $R^2$, $R^3$, $R^4$, $R^5$, $R^6$, $R^7$, and $R^8$ is either a hydrogen atom (—H) or one of the following functional groups: Lower straight chain alkyl, e.g. methyl, ethyl, propyl and butyl; aryl, e.g. parachlorophenyl; ar(lower)alkyl, e.g. 3,5-dimethylbenzyl; cycloalkyl having from 5 to 7 carbon atoms, e.g. cyclopentyl, cyclohexyl and cycloheptyl; and, together with its counterpart on the same ring carbon atom, polymethylene having from 4 to 6 carbon atoms, e.g. tetramethylene, pentamethylene and hexamethylene; with the proviso that (a) there are no more than three of said functional groups on two adjacent carbon atoms, (b) a plurality of cycloalkyl groups are not bound to adjacent carbon atoms, (c) a plurality of polymethylene groups are not bound to adjacent carbon atoms, and (d) there are a maximum of four of said functional groups on compounds I*b* and I*c*;

each of $R^9$, $R^{10}$, $R^{11}$, $R^{12}$, and $R^{13}$ is either a hydrogen atom (—H); a chlorine atom (—Cl); a fluorine atom (—F); a bromine atom (—Br); lower alkyl, preferably having from 1 to 4 carbon atoms, e.g. methyl, ethyl, propyl, isopropyl and butyl; lower alkoxy, preferably having from 1 to 4 carbon atoms, e.g. methoxy, ethoxy, propoxy, isopropoxy and butoxy; trifluoromethyl $$(—CF_3)$$

lower alkylthio, preferably having from 1 to 4 carbon atoms, e.g. methylthio, ethylthio, propylthio, isopropylthio and butylthio; or, together with its counterpart on an adjacent ring carbon atom, methylenedioxy $$(—O—CH_2—O—)$$

with the proviso that (a) at least one of $R^9$, $R^{10}$, $R^{11}$, $R^{12}$, and $R^{13}$ is a hydrogen atom in each aryl and in each ar(lower)alkyl group, (b) a plurality of trifluoromethyl groups are not bound to adjacent carbon atoms, (c) each $R^9$ and $R^{13}$ of aryl and aralkyl groups is a hydrogen atom in a plurality of such groups bound to the same ring carbon atom, (d) each of $R^9$ of aryl and aralkyl groups is a hydrogen atom in a plurality of such groups bound to adjacent ring carbon atoms; and (e) each of $R^9$ and $R^{13}$ of aryl and aralkyl groups bound to the same ring carbon atom as a cycloalkyl group is a hydrogen atom;

*n* is one of the integers 2, 3 and 4;

A is the azacycloalkanone ring of compounds I; and

B is the diheterocyclic ring of compound I.

There are several methods of preparing compounds I. The reaction schemes for two of these methods are presented for the instance when each of $R^1$ to $R^8$ is a hydrogen atom. However, having any of the contemplated functional groups in embodied positions does not alter said methods.

under the employed conditions. The heat that is indicated may vary, but reflux conditions are preferred.

The classes of compounds within the scope of this invention are:

I*a*1 2,3,5,6,7,7a-hexahydro-pyrrolo[2,1-b]thiazol-5-ones;

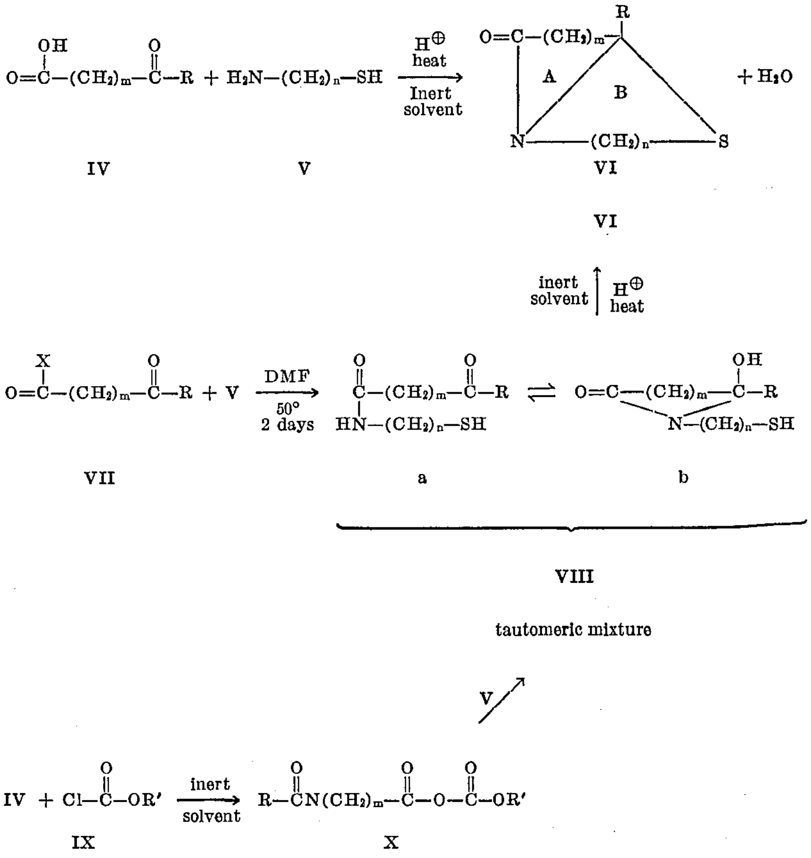

wherein R′ is lower alkyl (preferably having from 1 to 5 carbon atoms), e.g. methyl, ethyl, propyl, isopropyl, butyl and amyl;

*m* is one of the integers 2, 3 and 4; and

X is either a chlorine atom (—Cl) or a bromine atom (—Br).

The tautomeric mixture VIII is separated into its chemical individuals by known procedures, but such separation is not required to prepare compound VI, which is a particular subgroup of compounds I.

The reaction of IV with an alkyl chloroformate (alkyl chlorocarbonate) IX is effected in an inert solvent, e.g. toluene and diethylether, at a temperature from —10° to 100° C., preferably within the range of from —10° to 50° C. Stirring may be employed, but is not required.

For the noted reaction schemes only a catalytic amount of hydrogen ions is needed, as indicated. This is provided by a catalytic quantity of, e.g., paratoluenesulfonic acid. The inert solvent is any solvent, e.g. xylene which is inert to both the reactants and the reaction products I*a*2 3,4,6,7,8,8a-hexahydro-2H-pyrrolo[2,1-b][1,3] thiazin-6-ones;

I*a*3 2,3,4,5,7,8,9,9a-octahydro-pyrrolo[2,1-b][1,3] thiazepin-7-ones;

I*b*1 2,3,6,7,8,8a-hexahydro-5H-thiazolo[3,2-a]pyridin-5-ones;

I*b*2 2,3,7,8,9,9a-hexahydro-4H,6H-pyrido[2,1-b][1,3] thiazin-6-ones;

I*b*3 2,3,4,5,8,9,10,10a-octahydro-7H-pyrido[2,1][1,3] thiazepin-7-ones;

I*c*1 2,3,5,6,7,8,9,9a-octahydro-thiazolo[3,2-a]azepin-5-ones;

I*c*2 2,3,6,7,8,9,10,10a-octahydro-4H-thiazino[3,2-a] azepin-6-ones;

I*c*3 2,3,4,5,7,8,9,10,11,11a-decahydro-azepino[2,1-b] [1,3]thiazepin-7-ones.

Genus I*a* is exemplified in Table A; genus I*b*, in Table B; and genus I*c*, in Table C. The subgenera are exemplified in each table. The combination of genus and subgenus comprise the above-noted classes.

TABLE A.—COMPOUNDS Ia
| R | $R^1$ | $R^2$ | $R^3$ | $R^4$ | n |
|---|---|---|---|---|---|
| —Ph | —H | —Et | 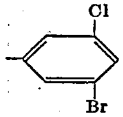 | —Ph | 3 |
| —Be | —H | —H | —H | —H | 4 |
| $—CH_2—CH_2—Ph$ | —H | 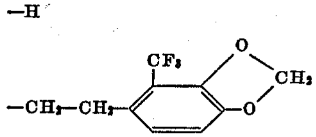 | —H | —H | 2 |
| 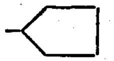 | —H | —H | —H | —Be | 3 |
|  | —Pr | —H | —Pr |  | 4 |
|  | 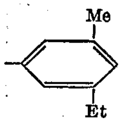 | —H | $—(CH_2)_6—$ | | 2 |
| 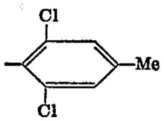 | —H | —H | 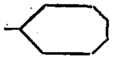 |  | 3 |
| 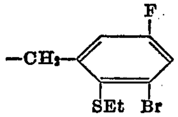 | —H | —Bu | 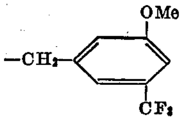 | 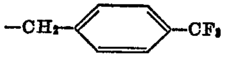 | 4 |
| 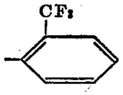 | —Ph | —Ph | —H | —Bu | 2 |
| 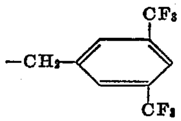 | —H | —H | $—(CH_2)_4—$ | | 3 |

TABLE A—Continued
| R | R¹ | R² | R³ | R⁴ | n |
|---|---|---|---|---|---|
| 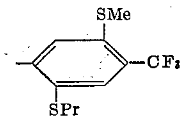 | 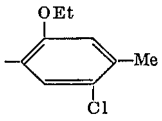 | —H | 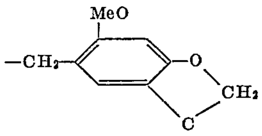 | —H | 4 |
| 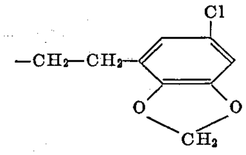 | —(CH₂)₅— | | 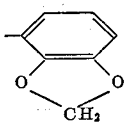 | —H | 2 |
| 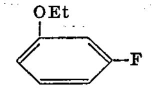 | —Be | —H | —Et | 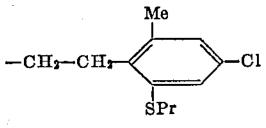 | 3 |
| 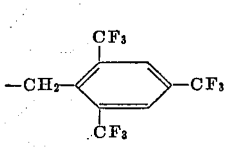 | —H | —H | —H | —H | 4 |
| 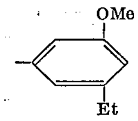 | —H | —H | 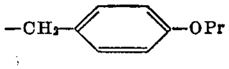 | 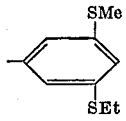 | 2 |
| 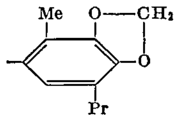 | 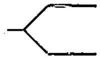 | 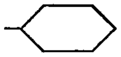 | —H | —H | 3 |
| 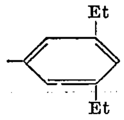 | —H | —H | —Et | —Me | 4 |

TABLE B.—COMPOUNDS Ib
| R | $R^1$ | $R^2$ | $R^3$ | $R^4$ | $R^5$ | $R^6$ | n |
|---|---|---|---|---|---|---|---|
| 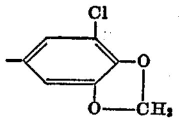 | —Me | 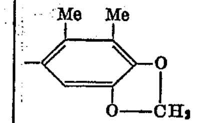 | —H | —H | —Me | —Be | 2 |
| 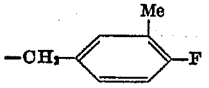 | $-(CH_2)_4-$ | | —H | —H | $-(CH_2)_6-$ | | 3 |
| 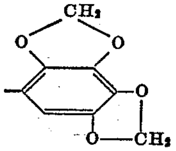 | —H | —H |  | 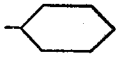 | —H | —H | 4 |
| 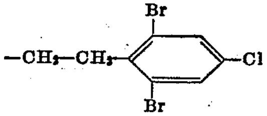 | —H | —H | —Pr | —Me | —H | —H | 4 |
| —Ph | 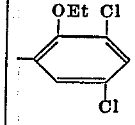 | —H | 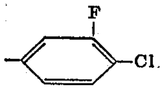 | 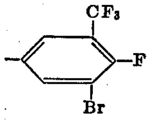 | —H | 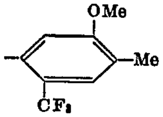 | 3 |
| 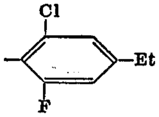 | —H | —H | —Ph | —Me | $-(CH_2)_6-$ | | 3 |
| —Be | —H | —H | —H | —Bu | 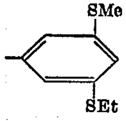 | 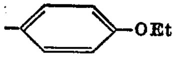 | 2 |
| 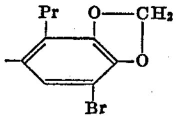 | —H | —H | —Me | —H | —H | —H | 2 |

TABLE B—Continued
| R | R¹ | R² | R³ | R⁴ | R⁵ | R⁶ | n |
|---|---|---|---|---|---|---|---|
| $-CH_2-Be$ | —H | —H | —H | —H | —Et | —H | 2 |
| 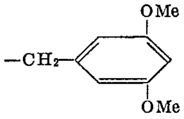 | —H | 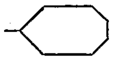 | $-(CH_2)_4-$ | | —Me | —H | 2 |
| 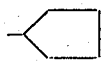 | 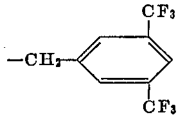 | —Ph | —H | —H | —H | —H | 4 |
| 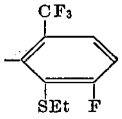 | —H | —H | 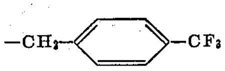 | —Be | —H | —H | 4 |
|  | —H | —H | —H | —H | 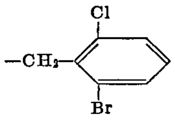 | —Et | 3 |
|  | $-(CH_2)_6-$ | | —H | —H | 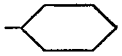 | 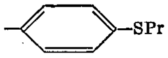 | 3 |
| 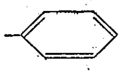 | 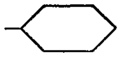 | —H | —H | —Pe | —H | —H | 4 |
| 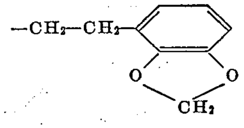 | —H | —H | 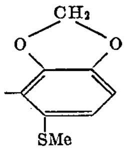 | —H | —Et | —H | 3 |
| 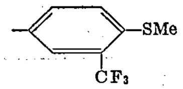 | —H |  | —H | —H | —H | —Me | 2 |

TABLE C.—COMPOUNDS Ic
| R | R¹ | R² | R³ | R⁴ | R⁵ | R⁶ | R⁷ | R⁸ | n |
|---|---|---|---|---|---|---|---|---|---|
| —Ph | $-(CH_2)_5-$ | | —H | —H | —H | —H | $-(CH_2)_6-$ | | 3 |
| —Be | —Me | —H | $-(CH_2)_6-$ | | —H | —H | —Me | —H | 4 |
| $-CH_2-CH_2-Ph$ | —H | —H | —Bu | —H | —H | —H | —H | —H | 4 |
| 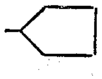 | 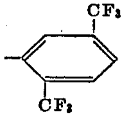 | —Me | —H | —H | —Et | —H | —H | —H | 4 |
| 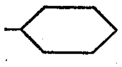 | —H | —H | 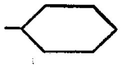 | —Me | —H | —H |  | —H | 2 |
| 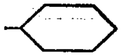 | —Bu | —H | —Pr | —H | $-(CH_2)_5-$ | | —H | —H | 2 |
| 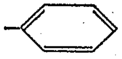 | 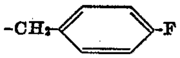 | 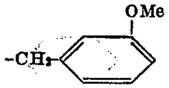 | —H | —H | —H | —H | 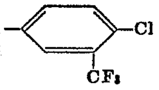 |  | 2 |
| 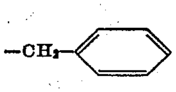 | —H | —H | 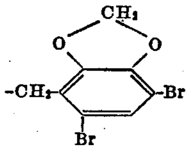 | —Me | —Et | —H | —H | —H | 3 |
| 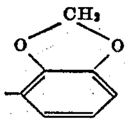 | —Bu | —H | —H | —H | —H | —H | —H | —H | 3 |
| 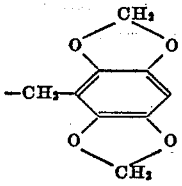 | —H | —H | —Be | —H | —H | —Pr | —H | —H | 4 |
| 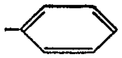 | —H | —H | $-(CH_2)_4-$ | | —H | —H | $-(CH_2)_5-$ | | 4 |
| 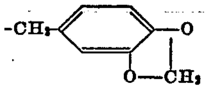 | —H | —H | —H | —H | 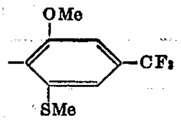 | —Me | —H | —H | 2 |

TABLE C—Continued
| R | $R^1$ | $R^2$ | $R^3$ | $R^4$ | $R^5$ | $R^6$ | $R^7$ | $R^8$ | n |
|---|---|---|---|---|---|---|---|---|---|
| 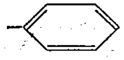 | —Pr | —H | —H | —H | —Be | —H | —Bu | —H | 3 |
| $-CH_2-CH_2-$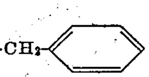 | —H | —H | —Ph | —H | —H | —H | $-CH_2-$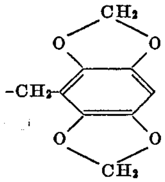 | —Me | 4 |
| 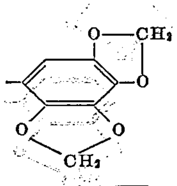 | —H | —H | $-(CH_2)_5-$ | | —H |  | —H | —Me | 4 |
| $-CH_2-$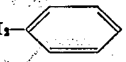 | —H | —H | —H | —H | $-CH_2-$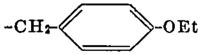-OEt | $-CH_2-$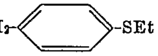-SEt | —H | -H | 4 |
| 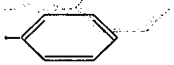 | —H | —H | —H | —H | $-(CH_2)_6-$ | | 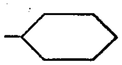 | 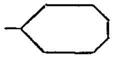 | 3 |
| $-CH_2-$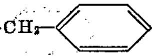 | 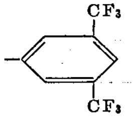 | 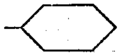 | —H | —H | 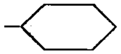 | 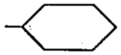 | —H | —H | 3 |
| 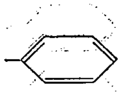 | —H |  | —H | 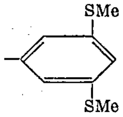 | —H | —Me | —H | 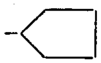 | 2 |
| $-CH_2-$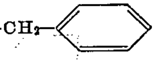 | —H | —H | —H | —Be | —H | —H | —H | —H | 2 |
| 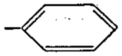 | —H | —H | 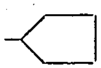 |  | 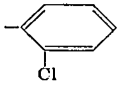 | —H | 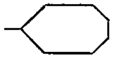 | —H | 2 |
| $-CH_2-$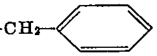 | —H | —H | —H | —H | —H | —Ph | —H | —H | 3 |
| 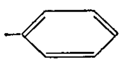 | 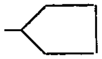 | 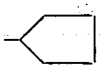 | —H | 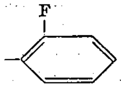 | —H | —H | —Me | —H | 4 |

Exemplary compounds within the scope of these classes are illustrated by definition of the variables in Tables A, B and C.

In the tables the following abbreviations are employed in addition to standard elemental symbols:

| | |
|---|---|
| —Me, methyl. | —Bu, butyl. |
| —Et, ethyl. | —Ph, phenyl. |
| —Pr, propyl. | —Be, benzyl. |

Each of the exemplary compounds is prepared in the above-described manner from corresponding starting materials and either IV or VII. These starting materials are either known or are prepared by known methods from available compounds.

Compounds I are CNS (central nervous system) active, e.g. depressants, sedatives, and anticonvulsants, compounds and are useful as such. Some also are useful as anti-inflammatories. Compounds I are administered either orally or parenterally in daily doses of from 75 milligrams to 200 milligrams.

Each of the pharmaceutically active compounds of this invention, may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 7 | 50 |
| Tragacanth | 2 |
| Lactose | 39.5 |
| Corn starch | 5 |
| Talcum | 3 |
| Magnesium stearate | 0.5 |
| Alcohol SD-30 } Purified water } | q.s. |

In the examples which follow, the parts and percentages are by weight unless otherwise specified, and the temperatures are in degree centigrade. The relationship between parts by weight and parts by volume is the same as that between the kilogram and the liter.

EXAMPLE 1

*8a-phenyl-3,4,6,7,8a-hexahydro-2H-pyrrolo[2,1-b][1,3] thiazin-6-one*

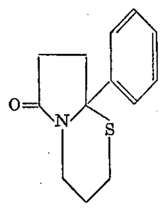

Charge a flask (equipped with a stirrer, heating mantle, condenser and a Dean-Stark tube) with 17.8 parts (0.1 mole) of 3-benzoylpropionic acid, 25.4 parts (0.2 mole) of 3-mercaptopropylamine hydrochloride, 1.0 part of paratoluenesulfonic acid, 16 parts by volume of 50 percent (aq) sodium hydroxide and 250 parts by volume of xylene. Stir and reflux until water ceases to separate in the Dean-Stark tube. Remove the solvent (xylene) on a rotary evaporator. Distill the resultant oil through a Claisen head to obtain an oil which solidifies on standing.

Dissolve the oil in hot diethyl ether. Admix the obtained solution with charcoal, and remove the ether in vacuo to obtain the title compound.

Replacing the 3-benzoylpropionic acid with an equivalent amount of 5-benzoylvaleric acid results in obtaining the corresponding compound I.

EXAMPLE 2

*9a-phenyl-2,3,7,8,9,9a-hexahydro-4H,6H-pyrido[2,1-b] [1,3]thiazin-6-one*

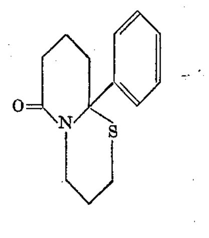

Charge a flask (equipped with a stirrer, heating mantle, condenser and a Dean-Stark tube) with 9.6 parts (0.05 mole) of 4-benzoylbutyric acid, 12.7 parts (0.1 mole) of 3-mercaptopropylamine hydrochloride, 0.5 part of p-toluenesulfonic acid, 8 parts by volume of 50 percent (aq) sodium hydroxide and 250 parts by volume of xylene. Stir and reflux the contents of the flask until water ceases to separate in the Dean-Stark tube. Remove the solvent on a rotary evaporator. Distill the resultant oil through a Claisen head to obtain an oil that solidifies on standing.

Dissolve the oil in hot diethyl ether. Admix the resulting solution with charcoal before removing the ether in vacuo. The title compound is thus obtained.

Replacing the 3-mercaptopropylamine hydrochloride with an equivalent amount of 4-mercaptobutylamine hydrochloride results in obtaining the corresponding compound I.

EXAMPLE 3

*8a-orthochlorophenyl-3,4,6,7,8,8a-hexahydro-2H-pyrrolo [2,1-b][1,3]thiazin-6-one*

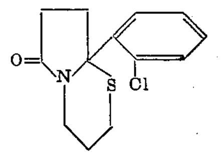

Charge a flask (equipped with a stirrer, heating mantle, condenser and a Dean-Stark tube) with 10.6 parts (0.05 mole) of 4-o-chlorophenyl-4-oxobutanoic acid, 12.7 parts (0.10 mole) of 3-mercaptopropylamine hydrochloride, 0.5 part of p-toluenesulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 4-o-chlorophenyl-4-oxobutanoic acid with an equivalent amount (10.6 parts) of 4-p-chlorophenyl-4-oxobutanoic acid with an equivalent amount (10.6 parts) of 4-p-chlorophenyl-4-oxobutanoic acid, an equivalent amount (12.4 parts) of 4-(2,4-dichlorophenyl)-4-oxobutanoic acid, an equivalent amount (12.4 parts) of 4-(3,4-dichlorophenyl)-4-oxobutanoic acid, an equivalent amount (9.8 parts) of 4-o-fluorophenyl-4-oxobutanoic acid, or an equivalent amount (9.8 parts) of 4-p-fluorophenyl-4-oxobutanoic acid results in the preparation, in similar manner, of the corresponding compound I.

EXAMPLE 4

*8-phenyl-8a-benzyl-2,3,6,7,8,8a-hexahydro-5H-thiazolo [3,2-a]pyridin-5-one*

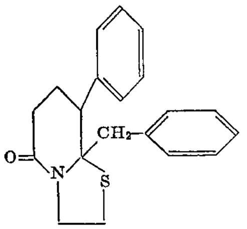

Charge a flask (equipped with a stirrer, heating mantle, condenser and a Dean-Stark tube) with 10.0 parts (0.035 mole) of 4,6-diphenyl-5-oxohexanoic acid, 8.4 parts (0.074 mole) of mercaptoethylamine hydrochloride, 0.5 part of p-toluenesulfonic acid, 7 parts by volume of 50 percent (aq) sodium hydroxide and 150 parts by volume of toluene. Stir and reflux the contents of the flask until water ceases to separate in the Dean-Stark tube. Remove the solvent (toluene) on a rotary evaporator.

Dissolve the resultant oil in methylene chloride/heptane. Admix the resulting solution with charcoal before removing the solvent (methylene chloride/heptane) in vacuo. The title compound is thus obtained.

EXAMPLE 5

*8a-phenyl-2,3,6,7,8,8a-hexahydro-5H-thiazolo[3,2-a] pyridin-5-one*

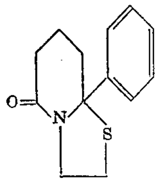

Charge a flask (equipped with a stirrer, heating mantle, condenser and a Dean-Stark tube) with 19.2 parts (0.1 mole) of γ-benzoylbutyric acid, 22.6 parts (0.2 mole) of mercaptoethylamine hydrochloride, 1 part of paratoluenesulfonic acid, 16 parts by volume of 50 percent (aq) sodium hydroxide and 150 parts by volume of xylene. Stir and reflux the contents of the flask until water ceases to separate in the Dean-Stark tube.

Remove the solvent on a rotary evaporator. Distill the resultant oil through a Claisen head to obtain an oil that solidifies on standing.

Dissolve the resultant oil in ethyl acetate. Admix the resulting solution with charcoal before removing the ethyl acetate in vacuo. There are thus obtained 14.1 parts of title compound, M.P. 105° to 106°.

EXAMPLE 6

*10a-phenethyl-2,3,6,7,8,9,10,10a-octahydro-4H-thiazino [3,2-a]azepin-6-one*

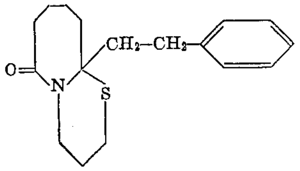

Charge a flask (equipped with a stirrer, heating mantle, condenser and a Dean-Stark tube) with 11.7 parts (0.05 mole) of 6-oxo-8-phenyloctanoic acid, 12.7 parts (0.10 mole) of 3-mercaptopropylamine hydrochloride, 0.5 part of paratoluenesulfonic acid, 8 parts of volume of 50 percent (aq) sodium hydroxide and 250 parts by volume of toluene. Stir and reflux the contents of the flask until water ceases to separate in the Dean-Stark tube. Remove the toluene on a rotary evaporator.

EXAMPLE 7

*8a-paramethoxyphenyl-3,4,6,7,8,8a-hexahydro-2H-pyrrolo [2,1-b][1,3]thiazin-6-one*

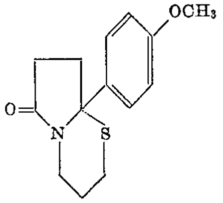

Charge a flask (equipped with a stirrer, heating mantle, condenser and a Dean-Stark tube) with 10.4 parts (0.05 mole) of 4-methoxyphenyl-4-oxobutanoic acid, 12.7 parts (0.10 mole) of 3-mercaptopropylamine hydrochloride, 0.5 part of p-toluenesulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 4-paramethoxyphenyl-4-oxobutanoic acid with an equivalent amount (12.6 parts) of 4-para-n-butoxyphenyl-4-oxobutanoic acid, an equivalent amount (9.6 parts) of 4-paratolyl-4-oxobutanoic acid, or an equivalent amount (10.4 parts) of 4-(2,4-dimethylphenyl)-4-oxobutanoic acid results in the preparation, in similar manner, of the corresponding compound I.

EXAMPLE 8

*8a-(3,4-dimethylphenyl)-3,4,6,7,8,8a-hexahydro-2H-pyrrolo[2,1-b][1,3]thiazin-6-one*

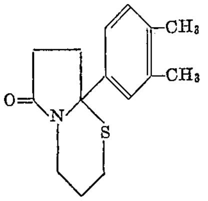

Charge a flask (equipped with a stirrer, heating mantle, condenser and a Dean-Stark tube) with 10.4 parts (0.05 mole) of 4-(3,4-dimethylphenyl)-4-oxobutanoic acid, 12.7 parts (0.10 mole) of 3-mercaptoethyamine hydrochloride, 0.5 part of p-toluenesulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 4-(3,4-dimethylphenyl) - 4 - oxobutanoic acid with an equivalent amount (12.3 parts) of 4-m-trifluoromethylphenyl-4 oxobutanoic acid or an equivalent amount (12.3 parts) of 4-p-trifluoromethylphenyl-4-oxobutanoic acid results in the preparation, in similar manner, of the corresponding compound I.

EXAMPLE 9

*8a-(2-chloro-5-trifluoromethylphenyl)3,4,6,7,8,8a-hexahydro-2H-pyrrolo-[2,1-b][1,3]thiazin-6-one*

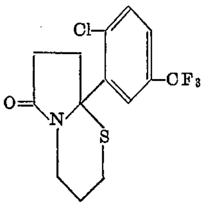

Charge a flask (equipped with a stirrer, heating mantle, condenser and a Dean-Stark tube) with 14.0 parts (0.05 mole) of 4-(2-chloro-5-trifluoromethylphenyl)-4-oxobutanoic acid, 12.7 parts (0.10 mole) of 3-mercaptoethylamine hydrochloride, 0.5 part of p-toluenesulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 4-(2-chloro-5-trifluoromethylphenyl)-4-oxobutanoic acid with an equivalent amount (14.1 parts) of 2-ethyl-2,4-diphenyl-4-oxobutanoic acid or an equivalent amount (15.8 parts) of 2-ethyl-2-phenyl-4-chlorophenyl-4-oxobutanoic acid results in the preparation, in similar manner, of the corresponding compound I.

EXAMPLE 10

*7-ethyl-7-phenyl-8a-paramethoxyphenyl-3,4,6,7,8,8a-hexahydro-2H-pyrrolo[2,1-b][1,3]thiazin-6-one*

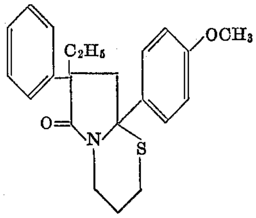

Charge a flask (equipped with a stirrer, heating mantle, condenser and a Dean-Stark tube) with 15.6 parts (0.05 mole) of 2-ethyl-2-phenyl-4-p-methoxyphenyl-4-oxobutanoic acid, 12.7 parts (0.10 mole) of 3-mercaptoethylamine hydrochloride, 0.5 part of p-toluene sulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 2-ethyl-2-phenyl-4-paramethoxyphenyl-4-oxobutanoic acid with an equivalent amount (17.5 parts) of 2-ethyl-2-phenyl-4-metatrifluoromethylphenyl-4-oxobutanoic acid or an equivalent amount (16.5 parts) of 2,2,4-triphenyl-4-oxobutanoic acid results in the preparation, in similar manner, of the corresponding compound I.

EXAMPLE 11

*7,7-diphenyl-8a-parachlorophenyl-3,4,6,7,8,8a-hexahydro-2H-pyrrolo[2,1-b][1,3]thiazin-6-one*

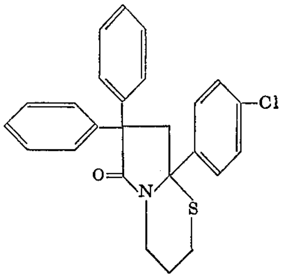

Charge a flask (equipped with a stirrer, heating mantle, condenser and a Dean-Stark tube) with 18.2 parts (0.05 mole) of 2,2-diphenyl-4-p-chlorophenyl-4-oxobutanoic acid, 12.7 parts (0.10 mole) 3-mercaptoethylamine hydrochloride, 0.5 part of p-toluenesulfonic acid, 8 parts by volume of 50 percent (aq) sodium hydroxide and 250 parts by volume of toluene. Stir and reflux the contents of the flask until water ceases to separate in the Dean-Stark tube. Remove the solvent (toluene) on a rotary evaporator.

Dissolve the resultant oil in methanol/water. Admix the resulting solution with charcoal before removing the solvent (methanol/water) in vacuo. The title compound is thus obtained.

Replacing the 2,2-diphenyl-4-parachlorophenyl-4-oxobutanoic acid with an equivalent amount (18.0 parts) of 2,2-diphenyl-4-p-methoxyphenyl-4-oxobutanoic acid or an equivalent amount (19.9 parts) of 2,2-diphenyl-4-m-trifluoromethylphenyl-4-oxobutanoic acid results in the preparation, in similar manner, of the corresponding compound I.

EXAMPLE 12

*7a-(2-chloro-5-trifluoromethylphenyl)-2,3,5,6,7,7a-hexahydro-pyrrolo[2,1-b]thiazol-5-one*

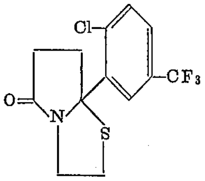

Charge a flask (equipped with a stirrer, heating mantle, condenser and a Dean-Stark tube) with 14.0 parts (0.05 mole) of 4-(2-chloro-5-trifluoromethylphenyl)-4-oxobutanoic acid, 11.3 parts (0.10 mole) of mercaptoethylamine, 0.5 part of paratoluenesulfonic acid, 8 parts by volume of 50 percent (aq) sodium hydroxide and 250 parts by volume of toluene. Stir and reflux the contents of the flask until water ceases to separate in the Dean-Stark tube. Remove the toluene on a rotary evaporator.

Dissolve the resultant oil in methanol/water. Admix the resulting solution with charcoal before removing the methanol/water in vacuo. The title compound is thus obtained.

Replacing the 4-(2-chloro-5-trifluoromethylphenyl)-4-oxobutanoic acid with an equivalent amount (14.1 parts) of 2-ethyl-2,4-diphenyl-4-oxobutanoic acid or an equivalent amount (15.8 parts) of 2-ethyl-2-phenyl-4-parachlorophenyl-4-oxobutanoic acid results in the preparation, in similar manner, of the corresponding compound I.

EXAMPLE 13

*10a-cyclopentyl-2,3,4,5,8,9,10,10a-octahydro-7H-pyrido [2,1-b] [1,3] thiazepin-7-one*

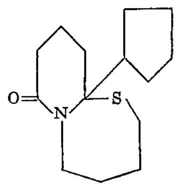

Charge a flask (equipped with a stirrer, heating mantle, condenser and a Dean-Stark tube) with 9.2 parts (0.05 mole) of 5-cyclopentyl-5-oxopentanoic acid, 14.1 parts (0.10 mole) of 4-mercaptobutylamine hydrochloride, 0.5 part of paratoluenesulfonic acid, 8 parts by volume of 50 percent (aq) sodium hydroxide and 250 parts by volume of toluene. Stir and reflux the contents of the flask until water ceases to separate in the Dean-Stark tube. Remove the toluene on a rotary evaporator.

Dissolve the resultant oil in methanol/water. Admix the resulting solution with charcoal before removing the methanol/water in vacuo. The title compound is thus obtained.

Replacing the 5-cyclopentyl-5-oxopentanoic acid with an equivalent amount of 3 - cyclohexyl - 4-ethyl-5-(3,4-methylenedioxyphenyl)-5-oxopentanoic acid results in the preparation, in similar manner, of the corresponding compound I.

EXAMPLE 14

*11a-cyclohexyl-2,3,4,5,7,8,9,10,11,11a-decahydro-azepino [2,1-b] [1,3] thiazepin-7-one*

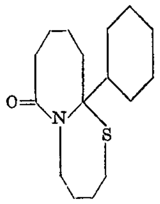

Charge a flask (equipped with a stirrer, heating mantle, condenser and a Dean-Stark tube) with 10.6 parts (0.05 mole) of 6-cyclohexyl-6-oxohexanoic acid, 14.1 parts (0.10 mole) of 4-mercaptobutylamine hydrochloride, 0.5 part of paratoluenesulfonic acid, 8 parts by volume of 50 percent (aq) sodium hydroxide and 250 parts by volume of toluene. Stir and reflux the contents of the flask until water ceases to separate in the Dean-Stark tube. Remove the toluene on a rotary evaporator.

Dissolve the resultant oil in methanol/water. Admix the resulting solution with charcoal before removing the methanol/water in vacuo. The title compound is thus obtained.

Replacing the 6-cyclohexyl-6-oxohexanoic acid with an equivalent amount of 2,2,4,8-tetraphenyl-6-oxo-octanoic acid results in the preparation, in similar manner, of the corresponding compound I.

EXAMPLE 15

*9a-cycloheptyl-2,3,5,6,7,8,9,9a-octahydro-thiazolo [3,2-a] azepin-5-one*

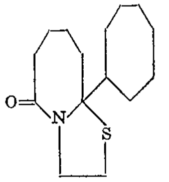

Charge a flask (equipped with a stirrer, heating mantle, condenser and a Dean-Stark tube) with 11.3 parts (0.05 mole) of 6-cycloheptyl-6-oxohexanoic acid, 11.3 parts (0.10) of mercaptoethylamine hydrochloride, 0.5 part of paratoluenesulfonic acid, 8 parts by volume of 50 percent (aq) sodium hydroxide and 250 parts by volume of toluene. Stir and reflux the contents of the flask until water ceases to separate in the Dean-Stark tube. Remove the toluene on a rotary evaporator.

Dissolve the resultant oil in methanol/water. Admix the resulting solution with charcoal before removing the methanol/water in vacuo. The title compound is thus obtained.

Replacing the 6-cycloheptyl-6-oxohexanoic acid with an equivalent amount of 2,2,5,5 - tetramethyl-6-oxo-7-(3-ethyl-5-methylthiophenyl)-heptanoic acid results in the preparation, in similar manner, of the corresponding compound I.

EXAMPLE 16

*8a-(4-methoxyphenyl)-3,4,6,7,8,8a-hexahydro-2H-pyrrolo [2,1-b] [1,3] thiazin-6-one*

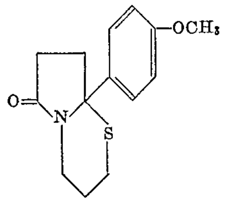

Charge a flask (equipped with a magnetic stirring bar, condenser thermometer and dropping funnel) with 4.0 parts (0.02 mole) of 3-(p-methoxybenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate (ethyl chlorocarbonate) in 20 parts by volume of chloroform] at such a rate that the internal temperature of the product does not exceed 10°.

Continue stirring for an additional 2.5 hours before adding dropwise to the resultant solution 2.54 parts (0.02 mole) of 3-mercaptopropylamine (dissolved in chloroform).

Stir the thus-produced solution overnight (17 hours) at room temperature (20°). Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride-diethylether to obtain N-(3-mercaptopropyl)-3-(p-methoxybenzoyl)-propionamide.

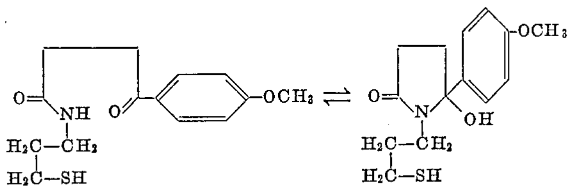

Charge a flask (equipped with a stirrer, heating mantle, condenser and a Dean-Stark tube) with 5.6 parts of N-(3-mercaptopropyl) - 3 - (p-methoxybenzoyl)-propionamide, 0.5 parts of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 17

*8a-(3,4-dichlorophenyl)-3,4,6,7,8,8a-hexahydro-2H-pyrrolo-[2,1b][1,3]thiazin-6-one*

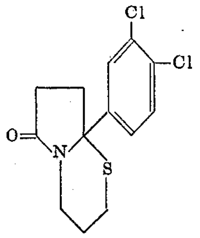

Charge a flask (equipped with a magnetic stirring bar, condenser, thermometer and dropping funnel) with 19.8 parts (0.08 mole) of 3(3,4-dichlorobenzoyl)propionic acid, 8.0 parts (0.08 mole) of trimethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 10.2 parts (0.0 mole) of 3-mercaptopropylamine dissolved in chloroform.

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethylether to obtain N-(3-mercaptopropyl)-3-(3,4-dichlorobenzoyl)-propionamide.

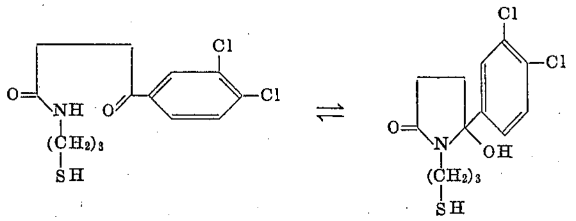

Charge a flask (equipped with a stirrer, heating mantle, condenser and a Dean-Stark tube) with 9.3 parts of N-(3-mercaptopropyl) - 3 - (3,4-dichlorobenzoyl)-propionamide, 0.5 parts of para-toluenesulfonic acid and 250 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride/pentane in vacuo. The title compound is thus obtained.

EXAMPLE 18

*8a-(4-fluorophenyl)-3,4,6,7,8,8a-hexahydro-2H-pyrrolo-[2,1-b][1,3]thiazin-6-one*

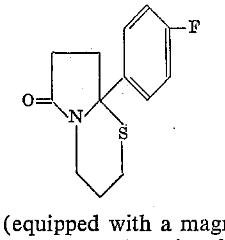

Charge a flask (equipped with a magnetic stirring bar, condenser, thermometer and dropping funnel) with 19.6 parts (0.10 mole) of 3-(4-fluorobenzoyl) propionic acid, 10 parts (0.10 mole) of triethylamine and 200 parts by volume of chloroform. Stir the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 12.7 parts (0.10 mole) of 3-mercaptopropylamine (dissolved in chloroform).

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethylether to obtain N-(3-mercaptopropyl)-3-(4-fluorobenzoyl)-propionamide.

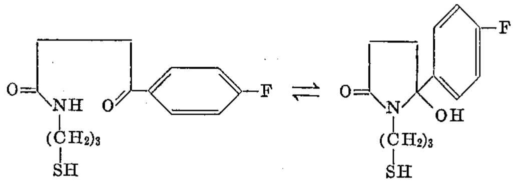

Charge a flask (equipped with a stirrer, heating mantle, condenser and a Dean-Stark tube) with 9.8 parts of N-(3-mercaptopropyl)-3-(4-fluorobenzoyl)-propionamide, 0.5 part of para-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanl/water in vacuo. The title compound is thus obtained.

EXAMPLE 19

*8a-(4-methylphenyl)-3,4,6,7,8,8a-hexahydro-2H-pyrrolo-[2,1-b][1,3]thiazin-6-one*

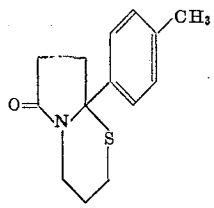

Charge a flask (equipped with a magnetic stirring bar, condenser, thermometer and dropping funnel) with 15.4 parts (0.08 mole) of 3-(4-methylbenzoyl)-propionic acid, 8.0 parts (0.08 mole) of triethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 10.2 parts (0.08 mole) of 3-mercaptopropylamine dissolved in chloroform.

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethyleter to obtain N-(3-mercaptopropyl)-3-(4-methylbenzoyl)-propionamide.

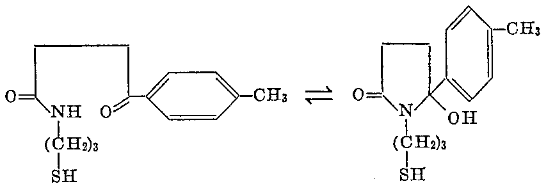

Charge a flask (equipped with a stirrer, heating mantle, condenser and a Dean-Stark tube) with 9.3 parts of N-(3-mercaptopropyl)-3-(4-methylbenzoyl)-propionamide, 0.5 part of paratoluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 20

*8a-(2,4-dimethylphenyl)-3,4,6,7,8,8a-hexahydro-2H-pyrrolo[2,1-b][1,3]thiazin-6-one*

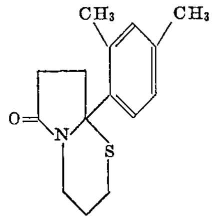

Charge a flask (equipped with a magnetic stirring bar, condenser, thermometer and dropping funnel) with 4.1 parts (0.02 mole) of 3-(2,4-dimethylbenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) ethyl chloroformate in 20 parts by volume of chloroform] at such a rate that the internal temperature of the product does not exceed 10°.

Continue stirring for an additional 2.5 hours before adding dropwise to the resultant solution 2.54 parts (0.02 mole) of 3-mercaptopropylamine (dissolved in chloroform).

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethylether to obtain N-(3-mercaptopropyl)-3-(2,4-dimethylbenzoyl)-propionamide.

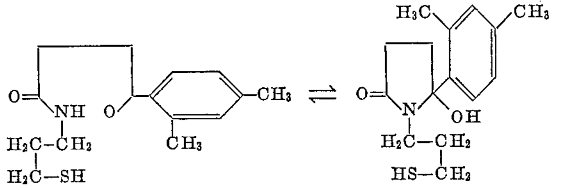

Charge a flask (equipped with a stirrer, heating mantle, condenser and a Dean-Stark tube) with 20.6 parts (0.10 mole) of 3-(2,4-dimethylbenzoyl)propionic acid, 25.4 parts (0.20 mole) of 3-mercaptopropylamine, 1.0 part of p-toluenesulfonic acid and 250 parts by volume of xylene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 21

*8a-(2,5-dimethylphenyl)-3,4,6,7,8,8a-hexahydro-2H-pyrrolo[2,1-b][1,3]thiazin-6-one*

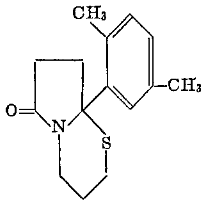

Charge a flask (equipped with a magnetic stirring bar, condenser, thermometer and dropping funnel) with 4.1 parts (0.02 mole) of 3-(2,5-dimethylbenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate in 20 parts by volume of chloroform] at such a rate that the internal temperature of the product does not exceed 10°.

Continue stirring for an additional 2.5 hours before adding dropwise to the resultant solution 2.54 parts (0.02 mole) of 3-mercaptopropylamine (dissolved in chloroform).

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethylether to obtain N-(3-mercaptopropyl)-3-(2,5-dimethylbenzoyl)propionamide.

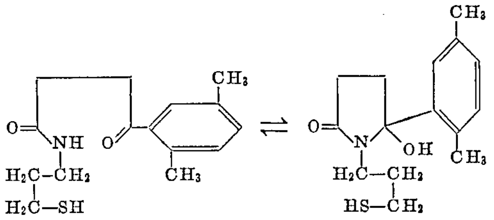

Charge a flask (equipped with a stirrer, heating mantle, condenser and a Dean-Stark tube) with 27.9 parts of N-(3-mercaptopropyl)-3-(2,5-dimethylbenzoyl)-propionamide, 1.0 part of p-toluenesulfonic acid and 500 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. The title compound is thus obtained.

EXAMPLE 22

*8a-(4-chlorophenyl)-3,4,6,7,8,8a-hexahydro-2H-pyrrolo[2,1-b][1,3] thiazin-6-one.*

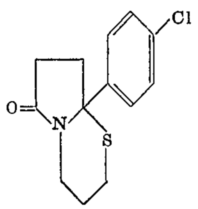

Charge a flask (equipped with a magnetic stirring bar, condenser, thermometer and dropping funnel) with 21.3 parts (0.10 mole) of 3-(p-chlorobenzoyl)-propionic acid, 10 parts (0.10 mole) of triethylamine and 200 parts by volume of chloroform. Stir the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 12.7 parts (0.10 mole) of 3-mercaptopropylamine (dissolved in chloroform.

Stir the thus-produced solution overnight at room temperature. Decant the chloroform solution from the flask, and wash said solution with water, 1 N hydrochloric acid and saturated (aq) sodium chloride solution. Dry the washed solution with sodium sulfate. Thereafter remove the solvent in vacuo on a rotary evaporator.

Crystallize the resultant oil from methylene chloride/diethylether to obtain N - (3 - mercaptopropyl) - 3 - (p-chlorobenzoyl)-propionamide.

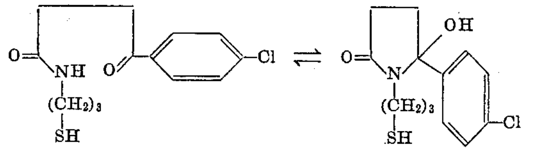

Charge a flask (equipped with a stirrer, heating mantle, condenser and a Dean-Stark tube) with 9.3 parts of N-(3 - mercaptopropyl) - 3(p - chlorobenzoyl) - propionamide, 0.5 parts of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride/pentane in vacuo. The title compound is thus obtained.

Various changes may be made in the structures of compound I without departing from the spirit and scope of the invention or sacrificing its material advantages. The enumerated exemplary compounds and the working examples merely provide illustrative embodiments.

What is claimed is:

1. A compound of the formula

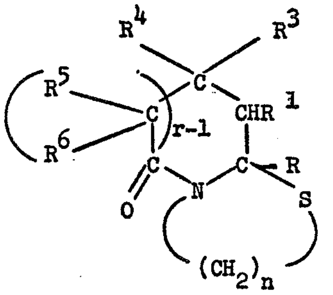

wherein R represents aryl or ar(lower)alkyl; the aryl and the ar- of ar(lower)alkyl being of the formula

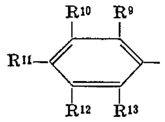

each of $R^1$, $R^3$, $R^4$, $R^5$ and $R^6$ is a member of the group hydrogen, straight chain(lower)alkyl, aryl or ar(lower) alkyl; or together with the member bound to the same carbon atom, polymethylene having from 4 to 6 carbon atoms; the aryl and the ar- of ar(lower)alkyl being of the formula

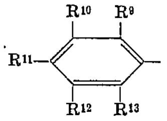

there being at most three of the members other than hydrogen bound to adjacent carbon atoms; a plurality of polymethylene groups not being bound to adjacent carbon atoms; and there being a maximum of four members of R, $R^1$, $R^3$, $R^4$, $R^5$ and $R^6$ other than hydrogen;

each $R^9$, $R^{10}$, $R^{11}$, $R^{12}$ and $R^{13}$ is a member of the group hydrogen, chloro, fluoro, bromo, lower alkyl, lower alkoxy, trifluoromethyl or lower alkylthio; or together with the member on the adjacent ring carbon atom, methylenedioxy; at least one of $R^9$, $R^{10}$, $R^{11}$, $R^{12}$ and $R^{13}$ being hydrogen; a plurality of trifluoromethyl groups not being bound to adjacent carbon atoms; each of $R^9$ and $R^{13}$ of aryl and ar(lower)alkyl groups being hydrogen in a plurality of such groups bound to the same carbon atoms; and each $R^9$ of aryl and ar(lower) alkyl groups being hydrogen in a plurality of such groups bound to adjacent carbon atoms;

*r* represents 1 or 2; and

*n* represents 2 or 3.

2. A compound of claim 1 wherein *r* is 1, *n* is 2 and R, $R^1$, $R^3$ and $R^4$ are as defined in claim 1.

3. A compound of claim 1 wherein *r* is 1, *n* is 3 and R, $R^1$, $R^3$ and $R^4$ are as defined in claim 1.

4. A compound of claim 1 wherein *r* is 2, *n* is 2 and R, $R^1$, $R^3$, $R^4$, $R^5$ and $R^6$ are as defined in claim 1.

5. A compound of claim 1 wherein *r* is 2, *n* is 3 and R, $R^1$, $R^3$, $R^4$, $R^5$ and $R^6$ are as defined in claim 1.

6. 8a - phenyl - 2,3,6,7,8,8a - hexahydro - 5H - thiazolo [3,2-a]pyridin-5-one.

References Cited

Todd, J. Am. Chem. Soc., vol. 75, pp. 1895–1900 (1953).

WALTER A. MODANCE, *Primary Examiner.*

J. M. FORD, *Assistant Examiner.*

Disclaimer 3,334,091.—*William J. Houlihan*, Mountain Lakes, N.J. SEDATIVES. Patent dated Aug. 1, 1967. Disclaimer filed Aug. 19, 1969, by the assignee, *Sandoz Inc.*

Hereby enters this disclaimer to claims 1 and 6 of said patent.

[*Official Gazette September 30, 1969.*]

Disclaimer 3,334,091.—*William J. Houlihan*, Mountain Lakes, N.J. SEDATIVES. Patent dated Aug. 1, 1967. Disclaimer filed Jan. 19, 1971, by the assignee, *Sandoz-Wander, Inc.*

Hereby enters this disclaimer to claims 2 through 5, inclusive, of said patent.

[*Official Gazette March 9, 1971.*]